N. Kinman,
Flour Packer,
№ 1,659, Reissued Apr. 26, 1864.
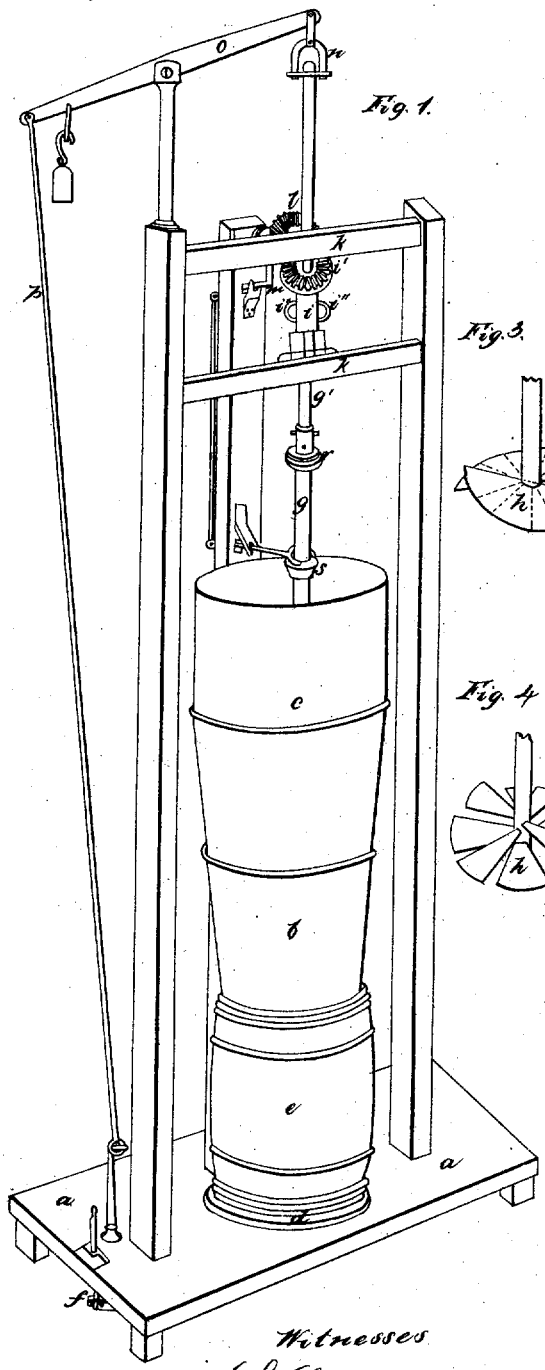
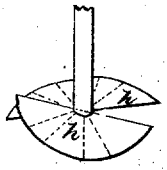
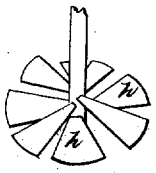
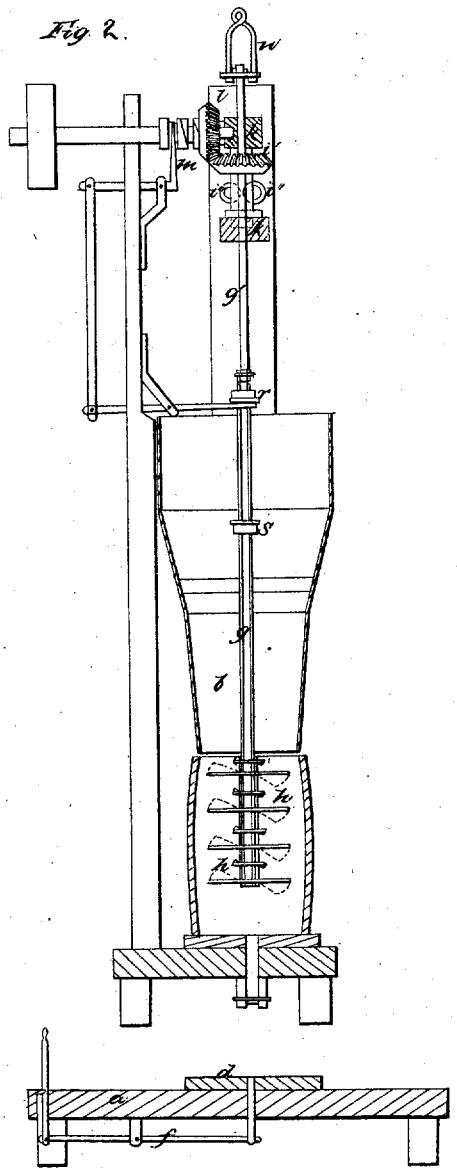
Witnesses
S S Sage
Bell M Page
Inventor:
Nathan Kinman
AM. PHOTO-LITHO. CO. N.Y. (OSBORNE'S PROCESS.)

UNITED STATES PATENT OFFICE.

NATHAN KINMAN, OF CAMBRIA, NEW YORK.

IMPROVEMENT IN FLOUR-PACKERS.

Specification forming part of Letters Patent No. 6,830, dated October 30, 1849; extended October 30, 1863; Reissue No. 1,659, dated April 26, 1864.

*To all whom it may concern:*

Be it known that I, NATHAN KINMAN, of Cambria, in the county of Niagara and State of New York, (formerly of Buffalo, New York,) have invented certain new and useful Improvements in Apparatus for Packing Flour; and I do hereby declare that the following is a full and complete description of the construction and operation of the same, reference being had to the accompanying drawings, making part of this specification, in which—

Figure 1 is a perspective view. Fig. 2 is a vertical section, and Figs. 3 and 4 are figures introduced for purposes of illustration.

Like letters refer to like parts in the several views.

The most important element in packing flour in large mills is expedition, and however perfect any apparatus may be in packing, if it has not this great desideratum it is useless in such situations.

The great object, therefore, of my improvement is to give greater expedition to the process of packing flour than has heretofore been done, retaining at the same time such parts of the old and well-known apparatus for packing as is necessary to carry out my design.

At a proper distance from the packing-floor *a* I suspend a tube, *b*, which will contain about a barrel of flour or a little more. This tube is somewhat larger at the top than at the bottom, the lower end being made to fit into the top of the barrel. The upper end of this tube connects with a chest or reservoir, *c*, of sufficient capacity to hold the flour of many hours' grinding.

Directly under the tube *b*, above named, there is a small movable platform, *d*, on which the barrel *e* is placed that is to be filled. This platform is raised by means of the lever *f* a distance to cause the open barrel to slip over the lower end of the tube, where it remains until the process of packing is completed, then by lowering the platform the barrel is removed and ready for replacing the head.

The packing apparatus consists of a shaft, *g*, that extends vertically through the center of the tube *b* to a sufficient height above the chest that contains the flour to be packed to receive the gearing hereafter to be described. This will vary in length from fifteen to forty feet, according to the size of the chest through which it passes. The lower end of this shaft *g* is provided with inclined blades or spiral flanges *h*, which nearly fill the diameter of the tube *b*. These are firmly secured to the shaft and rotate with it, the scroll-like blades or spiral flanges *h* acting upon the flour to condense and force it into the barrel, raising the shaft as the barrel becomes filled, and at the same time preventing the flour from falling from the tube while the filled barrel is being removed and an empty one replaced. The shaft *g* is hollow and open at the lower end, and at the upper end has lateral holes for the escape of the air contained in the empty barrel, as the shaft with the blades, flanges, or spiral scroll *h* descends with the flour from the tube *b*. To the upper end of the hollow shaft *g*, and above the lateral holes for the escape of air from the barrel, I attach, by means of a firm coupling, a solid shaft, *g'*. This solid portion has a groove cut into it on each side, and passes up through a sleeve, *i*, to the upper end of which is firmly attached the bevel-gear *i'*. The sleeve *i* has its bearings in two bridge-trees, *k k*, between which it is located. Two friction-wheels, *i''*, are inserted in the sides of the sleeve *i*, the peripheries of which extend into the grooves in each side of the shaft *g'* in such a manner that the shaft can move up and down as the sleeve is caused to revolve, the shaft at the same time revolving with the sleeve, as hereinafter more fully set forth.

One-half of the thickness of each of the bridge-trees *k k* is cut large enough for a bearing for the sleeve *i* or shaft of the bevel-gear *i'*, the upper serving also as a bearing for the shaft *g'*, by which it is kept in an upright position.

The bevel-gear *i* is connected with another bevel-gear *l*, placed on a horizontal shaft, and by which the whole is driven, the last-named gear-wheel *l* being loose on the shaft, with which it is connected by a clutch of ordinary construction, that is moved by a bent lever, *m*, hereinafter described.

The shaft *g'* is suspended from or by its upper end by a swivel, *n*, which swivel is attached to a lever, *o*. This lever *o* has a connecting-rod, *p*, affixed to its opposite end, by means of which the shafts *g g'*, with the spiral scroll or inclined blades, are raised and lowered.

The operation of this machine is as follows: The chest is filled with flour—say several hundred barrels—the flour passing down into the tube *b* and filling the same. An empty barrel with one head removed is now placed upon the platform *a* and elevated to the position shown in the drawings, and so as to embrace the lower end of the tube. The shaft *g*, with the spiral scrolls or blades, is now lowered into the barrel, carrying with it the flour contained in the lower end of the tube, and the shaft being hollow permits the air to escape through it from the barrel into the flour-chest above, by which I avoid the dust and waste that would occur if the air were suffered to escape through the flour at the sides of the barrel. When the shaft reaches the lowest point, a collar, *r*, placed thereon, strikes the bent lever *m*, above-named, and clutches the bevel-gearing with the prime mover, and thus causes the shaft *g g'* to revolve and pack the flour by means of the inclined blades or spiral scroll acting upon the flour in the barrel and tube. During this process the blades or scroll gradually rise up into the tube *b*, lifting the shaft, and packing or condensing the flour in the tube, rendering it ready for the next operation, and this I consider is a very important step, as it very much expedites the business of packing. As soon as the lower edge of the blades or scroll on the shaft have risen to a level with the bottom of the tube, another collar, *s*, properly adjusted upon the shaft, strikes the bent lever *m* and throws the clutch out of gear and stops the revolution of the shaft. The platform *a*, with the packed barrel of flour, is now lowered, and the packed flour breaks off from the main body of flour in the tube, the weight of which is sustained by means of the blades on the shaft. An empty barrel is then placed upon the platform and elevated so as to form contact with the tube. The shaft is then lowered again into the barrel, carrying with it the condensed flour in the tube, and the process of packing again commences by the revolving of the shaft; but inasmuch as the barrel is partly filled with flour previously condensed in the tube, the barrel becomes filled and packed more quickly, and the shaft with the blades ascend more rapidly than in the first operation, and every subsequent operation is the same while flour remains in the chest.

This process is repeated with each succeeding barrel till all the flour contained in the chest is packed.

The inclined blades are in a spiral position around the shaft, as shown in Fig. 2. A detached and enlarged section is shown in Fig. 4.

In Fig. 3 the dotted lines represent several sections of these blades as being united, forming thereby a wider blade or spiral scroll. In either form they are the same in action and produce the same results—namely, expedition and a great saving in the expense of packing flour.

What I claim as my improvement, and desire to secure by Letters Patent, is—

1. The packing of flour by means of inclined blades or spiral scrolls, substantially in the manner and for the purposes set forth.

2. The spout *b*, conjointly with the blades *h* or spiral scrolls, for directing the flour into the barrel and for holding the flour while the barrel is removed, substantially as set forth.

3. The hollow shaft *g* for the escape of the air as it is expelled from the barrel in packing flour.

4. The self-acting clutch, in combination with the packing apparatus in the manner above set forth.

NATHAN KINMAN.

Witnesses:
S. S. SAGE,
BELL M. SAGE.